(12) United States Patent
Musser, Jr.

(10) Patent No.: US 9,536,294 B2
(45) Date of Patent: Jan. 3, 2017

(54) PACKAGE ESSENCE ANALYSIS KIT

(71) Applicant: Home Box Office, Inc., New York, NY (US)

(72) Inventor: Elmer Gehman Musser, Jr., St. James, NY (US)

(73) Assignee: Home Box Office, Inc., New York, NY (US)

( * ) Notice: Subject to any disclaimer, the term of this patent is extended or adjusted under 35 U.S.C. 154(b) by 632 days.

(21) Appl. No.: 13/691,904

(22) Filed: Dec. 3, 2012

(65) Prior Publication Data

US 2014/0153652 A1   Jun. 5, 2014

(51) Int. Cl.
*H04N 7/12*   (2006.01)
*G06T 7/00*   (2006.01)

(52) U.S. Cl.
CPC ... *G06T 7/0004* (2013.01); *G06T 2207/10016* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 8,094,713 B2 | 1/2012 | Clark | |
| 8,270,475 B2 | 9/2012 | Sato | |
| 8,290,043 B2 | 10/2012 | Demos | |
| 2003/0004966 A1* | 1/2003 | Bolle | G06F 17/30253 |
| 2003/0193511 A1* | 10/2003 | Ferguson | 345/604 |
| 2006/0126948 A1* | 6/2006 | Fukuhara et al. | 382/232 |
| 2007/0083527 A1* | 4/2007 | Wadler | G06F 17/30852 |
| 2008/0285651 A1* | 11/2008 | Au et al. | 375/240.16 |
| 2009/0154571 A1* | 6/2009 | Choe | H04N 7/148 375/240.25 |
| 2009/0204895 A1* | 8/2009 | Bhatt et al. | 715/273 |
| 2009/0217212 A1* | 8/2009 | Madar | G09G 5/005 715/867 |
| 2009/0263014 A1* | 10/2009 | Zhang | G06F 17/30781 382/165 |
| 2010/0037059 A1* | 2/2010 | Sun et al. | 713/176 |
| 2011/0085734 A1* | 4/2011 | Berg | G06F 17/30802 382/195 |
| 2011/0222787 A1* | 9/2011 | Thiemert et al. | 382/225 |
| 2012/0128058 A1 | 5/2012 | Bakharov | |
| 2014/0003799 A1* | 1/2014 | Soroushian | H04N 9/8227 386/353 |

OTHER PUBLICATIONS

International Search Report and Written Opinion dated Apr. 15, 2014 corresponding to International Patent Application No. PCT/US13/70467, 23 pages.

* cited by examiner

*Primary Examiner* — Neil Mikeska (74) *Attorney, Agent, or Firm* — Eric L. Sophir; Dentons US LLP (57) ABSTRACT

Systems and methods are disclosed herein to a package essence analysis method comprising receiving, by a computer, first and second video files; indexing, by a computer, the first and second video files; decoding, by a computer, a selected frame of the first video file by referencing a first frame image using the index of the first video file; decoding, by a computer, a selected frame of the second video file by referencing a second frame image using the index of the second video file; and performing, by a computer, video quality analysis by comparing the decoded selected frame of the first video file to the decoded selected frame of the second video file.

20 Claims, 8 Drawing Sheets

| | A | B | C | D | E | F | G | H | I | J |
|---|---|---|---|---|---|---|---|---|---|---|
| | | | Frame # | PSNR | "Y" | | | | | Example PSNR run.csv |
| 1 | ######## | 0 PSNR Y | 2100 | 2100 | 100 | | | | | |
| 2 | 8/30/2011 | 1 PSNR Y | 2101 | 2101 | 100 | | | | | |
| 3 | 8/30/2011 | 2 PSNR Y | 2102 | 2102 | 100 | | | | | |
| 4 | 8/30/2011 | 3 PSNR Y | 2103 | 2103 | 100 | | | | | |
| 5 | 8/30/2011 | 4 PSNR Y | 2104 | 2104 | 100 | | | | | |
| 6 | 8/30/2011 | 5 PSNR Y | 2105 | 2105 | 100 | | | | | |
| 7 | 8/30/2011 | 6 PSNR Y | 2106 | 2106 | 100 | | | | | |
| 8 | 8/30/2011 | 7 PSNR Y | 2107 | 2107 | 94.06 | | | | | |
| 9 | 8/30/2011 | 8 PSNR Y | 2108 | 2108 | 86.36 | | | | | |
| 10 | 8/30/2011 | 9 PSNR Y | 2109 | 2109 | 81.52 | | | | | |
| 11 | 8/30/2011 | 10 PSNR Y | 2110 | 2110 | 69.19 | | | | | |
| 12 | 8/30/2011 | 11 PSNR Y | 2111 | 2111 | 52.23 | | | | | |
| 13 | 8/30/2011 | 12 PSNR Y | 2112 | 2112 | 48.24 | | | | | |
| 14 | 8/30/2011 | 13 PSNR Y | 2113 | 2113 | 47.36 | | | | | |
| 15 | 8/30/2011 | 14 PSNR Y | 2114 | 2114 | 44.72 | | | | | |
| 16 | 8/30/2011 | 15 PSNR Y | 2115 | 2115 | 44.41 | | | | | |
| 17 | 8/30/2011 | 16 PSNR Y | 2116 | 2116 | 44.74 | | | | | |
| 18 | 8/30/2011 | 17 PSNR Y | 2117 | 2117 | 45.55 | | | | | |
| 19 | 8/30/2011 | 18 PSNR Y | 2118 | 2118 | 45.95 | | | | | |
| 20 | 8/30/2011 | 19 PSNR Y | 2119 | 2119 | 45.83 | | | | | |
| 21 | 8/30/2011 | 20 PSNR Y | 2120 | 2120 | 45.33 | | | | | |
| 22 | 8/30/2011 | 21 PSNR Y | 2121 | 2121 | 45.73 | | | | | |

PACKAGE ESSENCE ANALYSIS KIT

TECHNICAL FIELD

The present invention relates generally to image analysis, and more particularly to analyzing a peak signal-to-noise ratio on video essence in a video package.

BACKGROUND

As the media industry moves from a tape-based system of storing content to a digital file-based system of storing content, AS02 MXF was created as an industry specification for loosely-coupled storage of individual sequence of pictures and synchronizing them with audio. The AS02 MXF container system attempts to address the problem of having a common file format in a facility that has to handle many input formats and make many output formats. But these packages usually include encoded video essence data that may be difficult to analyze without decoding the essence data. AS02 MXF is one example of a video package, but other video packages and package standards have also been discussed and implemented by digital systems.

Content providers must meet certain industry specifications for the video and audio quality of the content they publish. The AS02 MXF wrapped content or other video packages may come from a variety of different sources, and the quality of each piece of content must be analyzed before publishing the content. One way to analyze video quality is to measure the peak signal-to-noise ratio (PSNR). The PSNR may be measured by comparing video essence in a package to a source version of the file. Using the PSNR, a content provider may be able to determine if the package meets industry specifications for video quality. A content provider may need to perform this quality analysis because the video package may have generational losses in video quality as a result of decoding and re-encoding video essence.

In order to measure the PSNR of the video essence in a package, such as an MXF package, the package must be unpackaged and decoded before the PSNR of an individual video frame can be determined. The unwrapping and decoding process may take a very long time, especially if the video package contains a lot of data. Further, the decoding process may be further complicated because video files may be presented in either progressive or interlaced video formats. As a result, measuring the PSNR for an individual frame of a video essence track may take a long time to discover and also require many keystrokes from an operator trying to measure the PSNR. Furthermore, a video file contains thousands of frames, depending on the length of the piece of content, and performing PSNR for the entire video file could take a very long time to perform for any skilled video editor.

As shown by all of the above discussed limitations, a tool is desired to overcome the limitations by quickly, easily, and automatically measuring a PSNR from a packaged video file.

SUMMARY

The systems and methods described herein attempt to overcome the drawbacks discussed above by providing a tool kit that is capable of analyzing video essence in a video package without unwrapping the video package. The tool kit is able to index a video package and point to any frame of the video essence. Once the index has been created, the tool decodes video frames on the fly to present video frames in a format that is conducive for measuring a peak signal-to-noise ratio (PSNR).

In one embodiment, a packaged video essence analysis method comprises receiving, by a computer, first and second video files; indexing, by a computer, the first and second video files; decoding, by a computer, a selected frame of the first video file by referencing a first frame image using the index of the first video file; decoding, by a computer, a selected frame of the second video file by referencing a second frame image using the index of the second video file; and performing, by a computer, video quality analysis by comparing the decoded selected frame of the first video file to the decoded selected frame of the second video file.

In another embodiment, a computer program product for performing video quality analysis comprising a non-transient computer readable medium having a computer readable program, wherein the computer readable program including a video analyzer module that when executed on a processor causes a computer to: receive a first and second video file or set of files; index the first and second video files; decode a selected frame of the first video file by referencing a first frame image using the index of the first video file; decode a selected frame of the second video file by referencing a second frame image using the index of the second video file; and perform video quality analysis by comparing the decoded selected frame of the first video file to the decoded selected frame of the second video file.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Video packages may follow the AS02 application specification in order to build systems that work at the MXF level rather than at a video file level, such as MPEG or JPEG2000. MXF is an abbreviation for Material Exchange Format, which is a container format for professional digital video and audio media defined by the society of motion picture and television engineers (SMPTE) standards. An MXF package can be considered as a wrapper format that supports a number of different streams of coded essence together with metadata, which describes the material contained in the MXF file. AS02 outlines a file structure for an asset, and all of the files belonging to the asset are stored under a single root folder. Within an AS02 file structure, all of the essence components are placed in a media subfolder. The AS02 package may also contain an extra folder that contains metadata that describes things like show layout (position of the breaks), custom XML, and other associated files. The package essence analysis kit performs video quality analysis, such as a peak signal-to-noise ratio (PSNR) determination, on the package without having to unwrap the package. Thus, the AS02 package may remain in the state described, and the video essence can still be analyzed.

AS02 MXF is one example of a video package, but other video packages and package standards have also been discussed and implemented by digital systems. PSNR analysis may be performed on other types of video packages that bundle movie images and audio files together. While AS02 MXF may be common in the media content distribution industry, the embodiments described below may be adapted to any wrapped and bundled video files.

Figure 1:
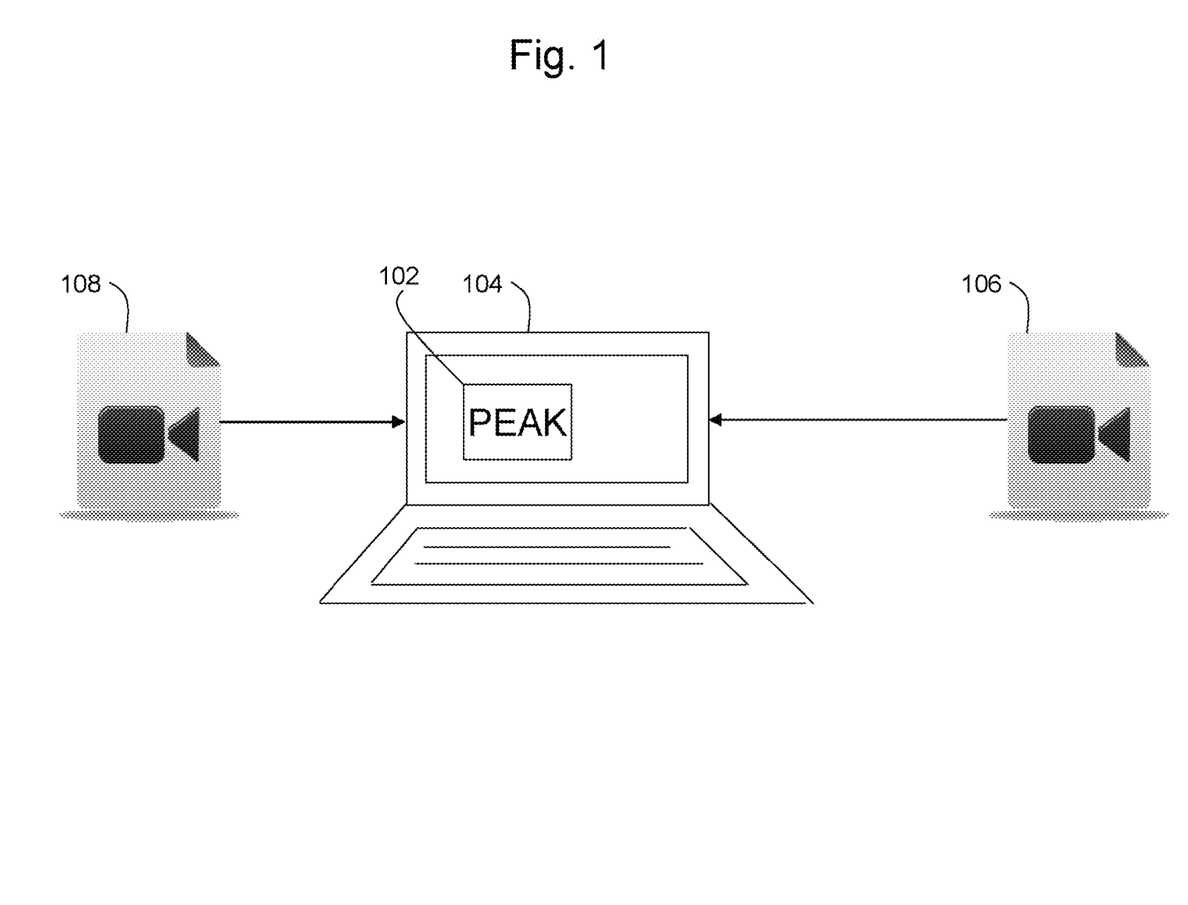
FIG. 1 illustrates the package essence analysis kit implemented on a computing system that receives video packages according to an exemplary embodiment.

Referring to FIG. 1, the package essence analysis kit (PEAK) may be considered a software module 102 stored on a non-transient computer-readable medium and executed by a processor of a computing device 104. The computing device 104 may be any computer device capable of reading digital images and videos, such as a personal computer or a server. The PEAK software module 102 receives a first video file 106 and a second video file 108. The first and second video files 106, 108 may be two files that contain the same media content, in other words, the first and second video files 106, 108 contain the same essence. However, the first and second video files 106, 108 may be different in terms of file format. For example, the first video file 106 may be an AS02 package including MXF files while the second video file 108 may be a video file in a video format such as JPEG2000 or MPEG. As another example, either the first or second video file 106, 108 may be an image file, such as a TIFF file. Further, the first and second video files 106, 108 may comprise video having different frame rates, and for example, the first video file 106 includes progressive essence whereas the second video file 108 includes interlaced essence. As illustrated through all of these examples, the first and second video files 106, 108 may be any video or image type, and the PEAK software module 102 is able to recognized the file format of the first and second video files 106, 108 and adapt to different data formats.

Figure 2:
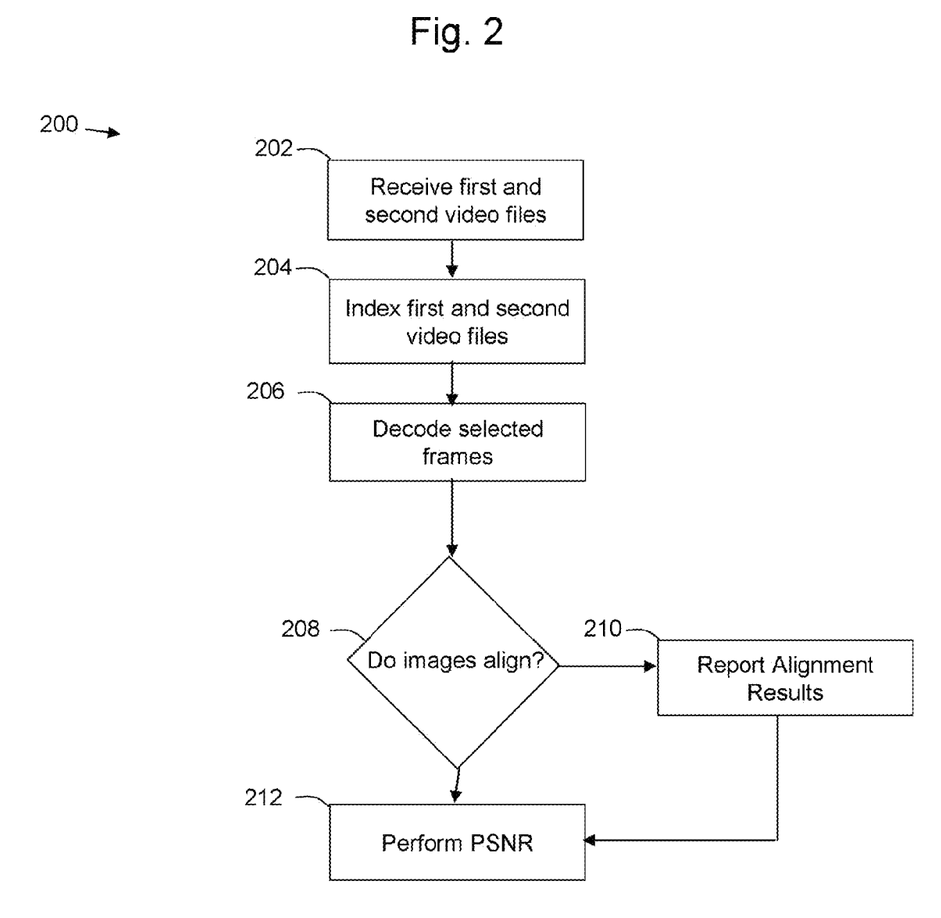
FIG. 2 illustrates the method of analyzing a video package for peak signal-to-noise ration according to an exemplary embodiment.

A method 200 implemented by the PEAK software module 102 is illustrated in FIG. 2. As shown in FIG. 2, the method 200 begins when the PEAK software module 102 receives the first and second video files 106, 108 in step 202. As discussed above, the first and second video files 106, 108 may be AS02 video packages, video files, or image files. The PEAK software module 102 is configured to determine the frame rate of the first and second video packages 106, 108, and by using the determined frame rate, the PEAK software module 102 is able to determine whether the first and second frame rates are progressive or interlaced video files. The first and second video files 106, 108 do not have to match in file format or video frame rate in order to be analyzed. The first and second video files 106, 108 may be selected by a user through a drag-and-drop operation, or by a file selection method.

Subsequently to receiving the first and second video files 106, 108, the PEAK software module 102 indexes the first and second video files 106, 108 in step 204. By indexing the first and second video files 106, 108, the PEAK software module 102 is able to quickly access and analyze individual frames of a video files or package. The indexing step 204 is performed instead of unwrapping an MXF package, if either of the first or second video files 106, 108 includes an MXF package. An unwrapping operation of an MXF package may take a long time to complete, for example, up to one half hour or more, depending on the performance specifications of a processor and computer system. In comparison, an indexing operation may take a typical computing device 104 less than a second to complete. Thus, the indexing method used for video quality analysis can save processing time. If either of the first or second video files 106, 108 is not a video file, but instead is just a frame image, the indexing operation in step 204 may be skipped.

Indexing the first and second video files 106, 108 provides the PEAK software module 102 with an identifiable frame number or time code used by the PEAK software module 102 to specify each frame image. Thus, the indexing operation performed in step 204 does not extract an image, but instead can provide a location pointing to where the frame image may be located. The first and second video files 106, 108 may contain the same video essence, but the frame numbers and time codes may not necessarily be the same for all frame images. If either the first or second video files 106, 108 is an MXF bundle, the indexing operation explores the MXF bundle and generates index values for each frame image. The index then points to an encoded video file, for example, a JPEG2000 file. While JPEG is described as an exemplary codec, the PEAK software module 102 is configured to perform decoding of any codec for video files.

After the first and second video files 106, 108 are indexed in step 204, the PEAK software module 102 decodes a selected frame for both the first and second video files 106, 108 in step 206. As discussed above, the first and second video files 106, 108 are not unwrapped, but instead are indexed. Thus, the PEAK software module 102 does not decode the entire video files, but the PEAK software module 102 decodes only a selected frame, which has an indexed value as a result of the indexing operation in step 202. In other words, the PEAK software module 102 can decode frames by pointing to the frame within the package and decoding a single frame at a time, which also saves processing time and power. Each frame is decoded individually using the indexed values. Continuing the MXF/JPEG2000 example above, an indexed MXF package containing a JPEG2000 file is decoded and converted to an uncompressed image file, such as a PGM file or a TIFF. The selected frame may not be the same for the first and second video files 106, 108. For example, the selected frame has a corresponding reference number in the index, and the PEAK software module 102 uses the index and the corresponding reference number to extract the first and second frame images. While a reference number has been described as an example, two frames may be aligned through other alignment methods as well, such as using a time stamp or by aligning the first frame of each video signal.

After the first and second video files 106, 108 are decoded, two decoded and uncompressed image files are stored in the memory of a computer. If two different selected frames do not contain aligned images, the PEAK software module 102 is able to notify the user of such misalignment, and the PEAK software module 102 is also able to provide PSNR data based on misaligned frame images. The PEAK software module 102 can then perform a matching and alignment test to determine if the two decoded images are properly aligned in step 208. If the images are not aligned, the method continues to step 210, and the PEAK software module 102 reports the results of the alignment and matching test. Using the results of the alignment and matching test, the PEAK software module 102 may be able to suggest that the two decoded images are not referencing the same frame of the video essence. Once the alignment results are reported in step 210, or if the two decoded images are properly aligned, the method 200 continues to step 212 when the PEAK software module 102 performs PSNR analysis, or another type of video quality analysis, on the two images. The PSNR data may be reported as a logarithmic value because the two decoded and uncompressed frame images may have large dynamic ranges.

Figure 3:
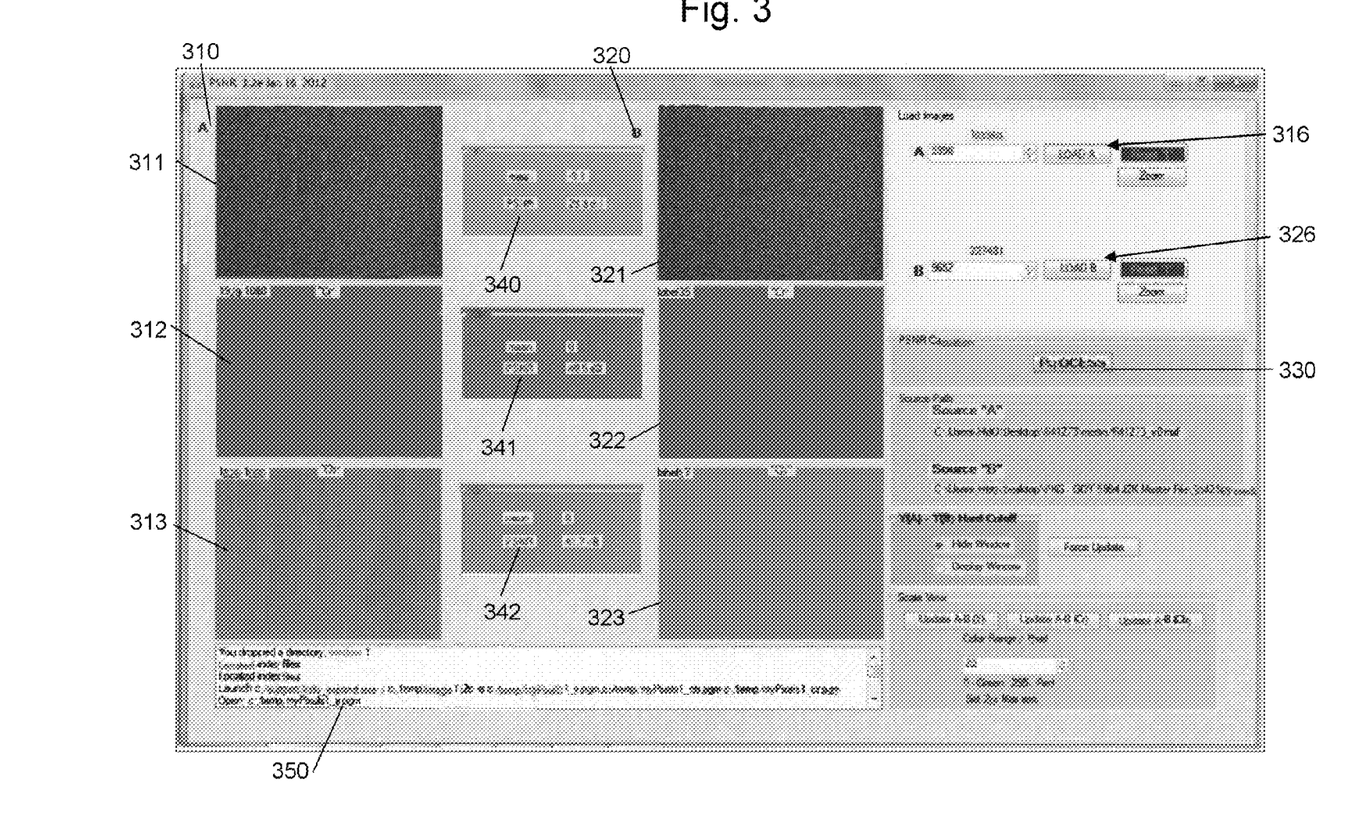
FIG. 3 illustrates a screen shot of the package essence analysis kit implemented on a computing system according to an exemplary embodiment.
Figure 4:
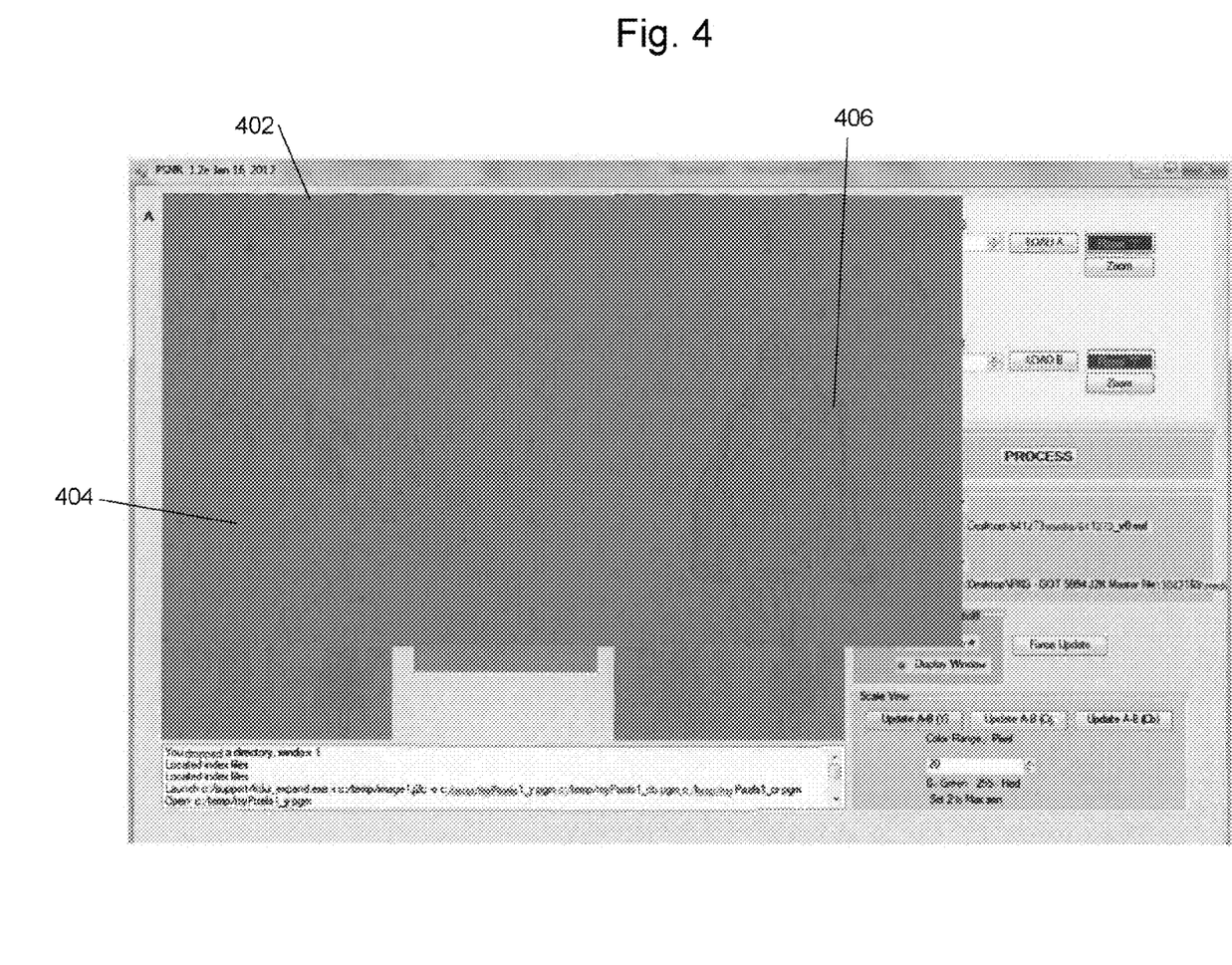
FIG. 4 illustrates a screen shot of a results display for unmatched frames in the package essence analysis kit implemented on a computing system according to an exemplary embodiment.
Figure 5:
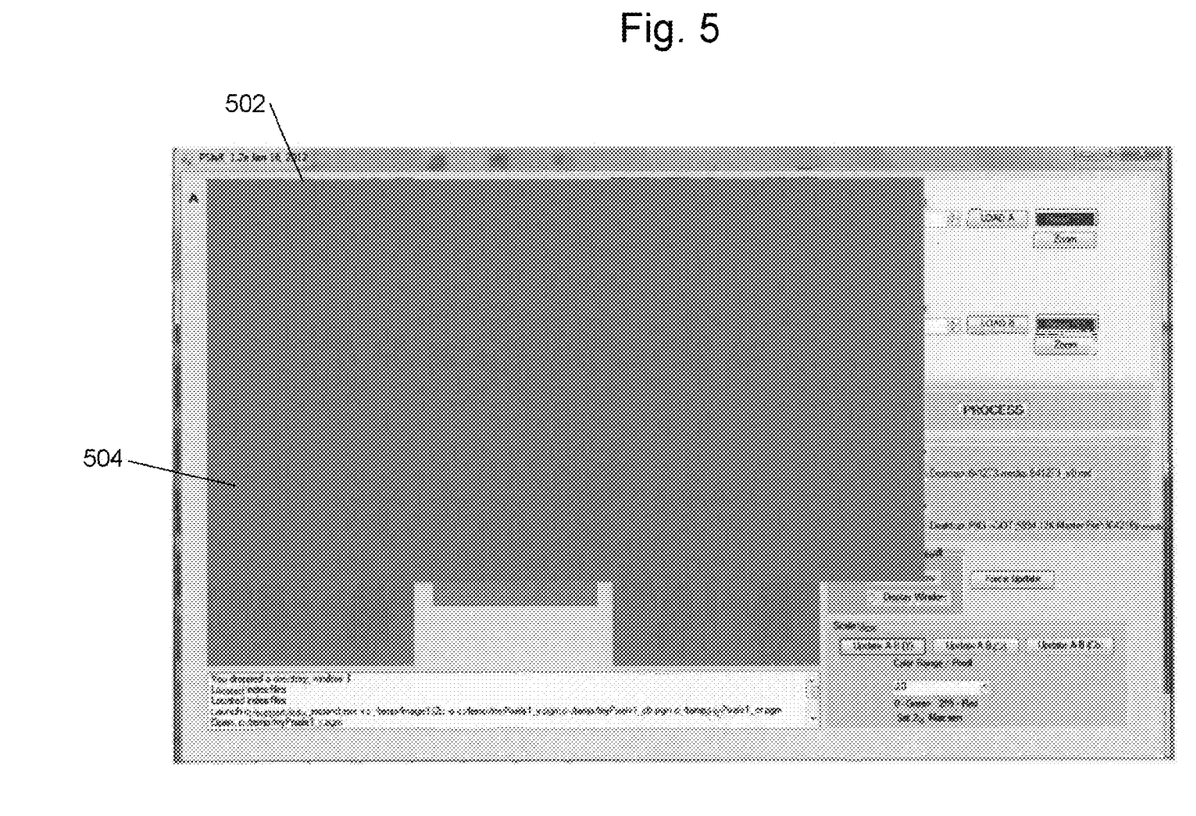
FIG. 5 illustrates a screen shot of a results display for matching frames in the package essence analysis kit implemented on a computing system according to an exemplary embodiment.

Referring now to FIGS. 3 to 5, screen shots of the PEAK software module 102 that can be displayed on a graphical user interface of a computer are illustrated. Referring to FIG. 3, a screen shot of a graphical user interface of the PEAK software module 102 is illustrated. In the graphical user interface, two video sources are loaded and shown. The first video file is loaded into a "A" side 310. The "A" video side 310 includes three windows: the first window 311 represents the luma (Y) component of the frame image, the second window 312 represents the red-difference chroma (Cr) component of the frame image, and the third window 313 represents the blue-difference chroma (Cb) component of the frame image. The second video file may be loaded into a "B" video side 320, and the "B" video side includes three windows 321, 322, 323, which also represent Y, Cr, and CB. For example, on a right side of the main window, a frame of the first video file and a frame of the second video file may be selected using load image buttons 316 and 326. A first load image button 316 may load a frame image of the first video file, and a second load image button 326 may load a frame image of the second video image file. Once the two frame images are loaded, and after the first and second load image buttons 316, 326 are pressed, the frame images may be displayed in the three windows for the "A" side 311, 312, 313 and the three windows for the "B" side 321, 322, 323.

As an exemplary operation, the first frame of the video essence may be displayed before any selected frames are loaded. However, in many situations the first frame of a video file may be a black screen, which is not particularly useful for PSNR analysis.

After a process button 330 is selected (e.g., pressed, touched, activated), a PSNR value may be calculated. Alternatively, this calculation may be performed automatically without requiring a user to press the process button 330. A PSNR value for the Y component 340, a PSNR value for the Cr component 341, and a PSNR value for the Cb component 342 are calculated and displayed to a user on the graphical user interface. Also displayed to the user may be the processing progress, as shown in a list 350. The list 350 may include progress reports, such as reporting that a video file was loaded into the PEAK software module, notifying the user when the video files are indexed, and when PSNR processing is completed. Additionally, another process button may be included that executes a process that performs video quality analysis for every frame in the first and second video files.

Referring now to FIG. 4, a screen shot of one of the features of the PEAK software module displayed to a user on a graphical user interface is illustrated. After the PSNR values have been processed and the matching and alignment test is performed, a results window 402 may be displayed as a graphical user interface on a computer of the user. The results window 402 is able to illustrate where mismatching occurs. A first color 404 may represent that a pixel in the image of the "A" source matches a pixel in the image of the "B" source. A second color 406 may represent that a pixel in the image of the "A" source does not match a pixel in the image of the "B" source. For example, the first color 404 may be green, and the second color 406 may be red. In another example, the first color 404 may be white, and the second color 406 may be black. These exemplary color combinations may be changed to any colors, but preferably the difference in the colors should be instantly recognizable (e.g., different hues or contrast between colors). While visually displaying mismatching, the PEAK software module may also report mismatch using a numerical identifier, for example, a percentage of the pixels that match between the two frame images. This feature of illustrating mismatches with colors may also be applied to the situation when generational losses are found by the PEAK software module. For example, where a generational loss is detected, the results window 402 may illustrate a black pixel, and where no generational loss is detected, a white pixel may be illustrated (or any other color combination). The results window 402 could then display the amount of generational loss between the first and second video files.

Referring to FIG. 5, the feature of the PEAK software module that is illustrated in FIG. 4 is illustrated with aligned frame images. As shown in FIG. 5, a results window 502 contains only a first color 504, which means that the frame image in the "A" source and the frame image of the "B" source align and match.

Figure 6:
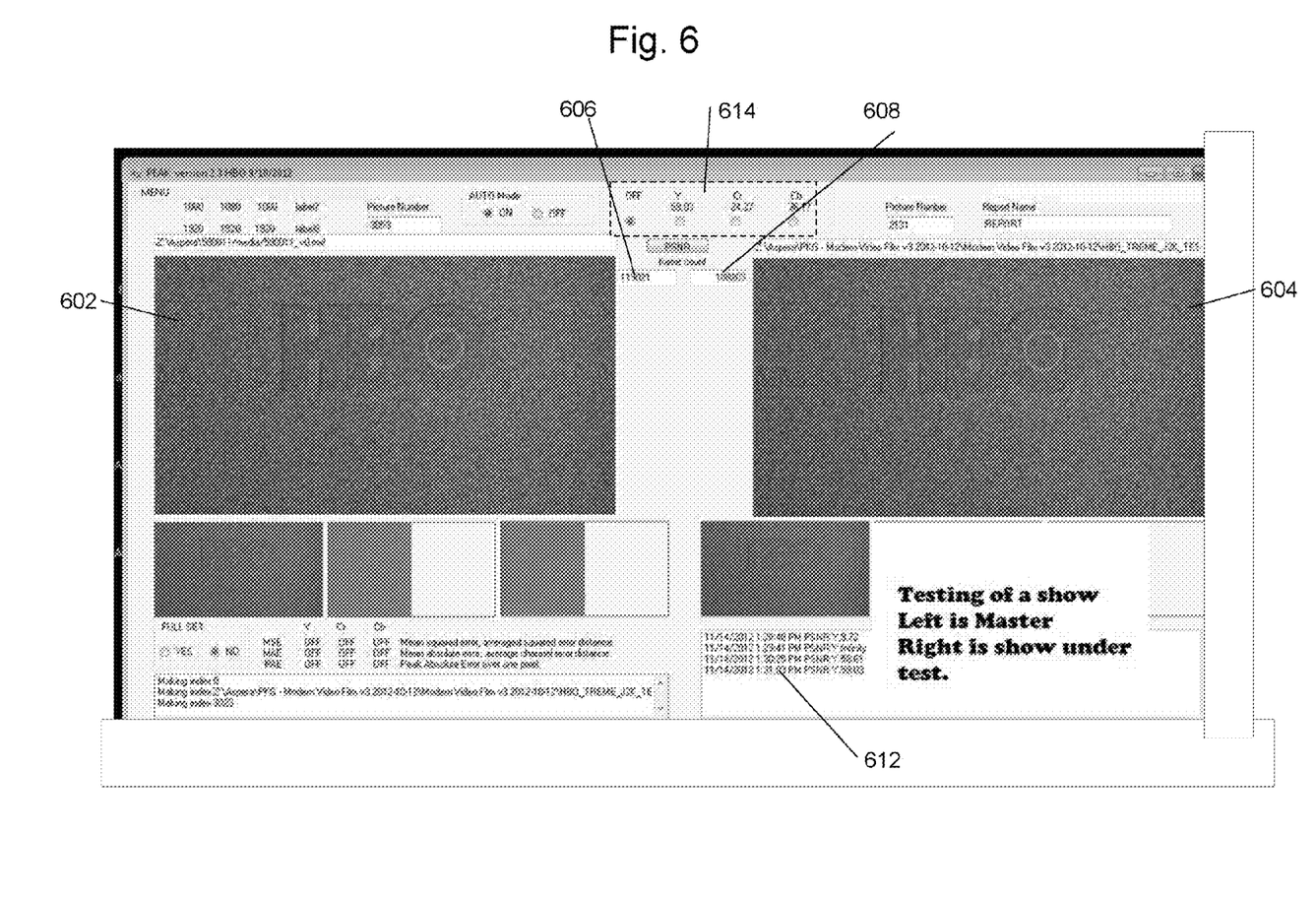
FIG. 6 illustrates a screen shot of the package essence analysis kit implemented on a computing system according to another exemplary embodiment.

Referring to FIG. 6, another perspective of the graphical user interface of the PEAK software module is illustrated. As shown in FIG. 6, a first AS02 bundle 602 and a second AS02 bundle 604 have been uploaded into the PEAK software module. Within the PEAK software module of the exemplary embodiment illustrated in FIG. 6, frame count input boxes 606, 608 are displayed for each of the first and second AS02 bundles 602, 604. Once a frame has been selected by inputting a frame number into the frame count input boxes 606, 608, the PEAK software module is configured to calculate a PSNR value. The PEAK software module may also display a comparison frame (not shown) on a computer of the user. The comparison frame may be displayed in the middle of a screen or the comparison frame may be displayed in a designated area or window. The value of the PSNR value may be displayed in multiple areas of the screen and may be calculated for Y, Cr, and Cb components. As shown in FIG. 6, the PSNR value is reported in a status window 612. The PSNR value may also be displayed next to a bullet selection portion of the screen 614, which is where a user may select whether to display a comparison frame of the Y, Cr, or Cb components. The PEAK software module may include other features displayed in a window and more user options. Such features may include showing a file name, displaying the resolution of a frame, and displaying previews of comparison frames for the Y, Cr, and Cb components.

Figure 7:
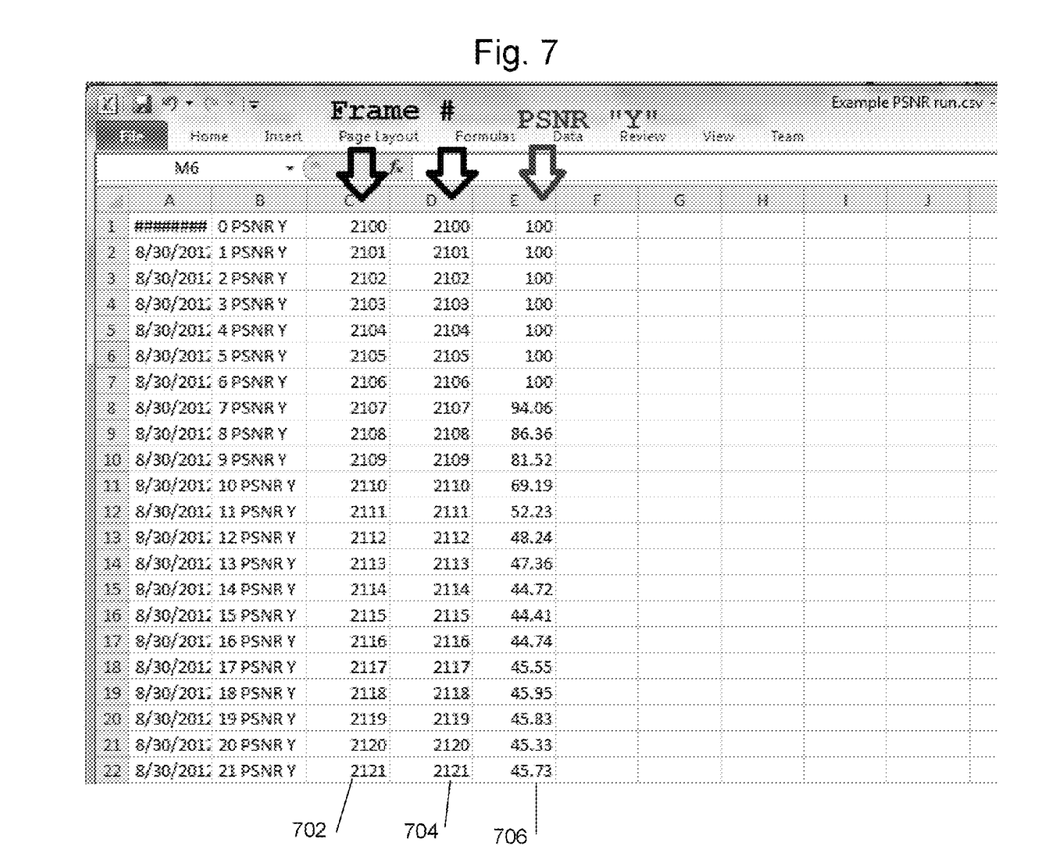
FIG. 7 illustrates a screen shot of the peak signal-to-noise ratio analysis exported to a spreadsheet application according to an exemplary embodiment.

Another exemplary feature of the PEAK software module is illustrated in FIG. 7. As shown in FIG. 7, the PEAK software module is configured to export the results of the PSNR analysis for every frame in a video file to a spreadsheet software application, such as Microsoft® Excel® or Macintosh® Numbers®. As shown in FIG. 7, the PEAK software module 102 exports the frame number from each of the compared video files 702, 704 and the calculated PSNR value for one of the Y, Cr, or Cb components 706. While only the Y component is illustrated as being exported to the spreadsheet application, the PEAK software module may export up to all three of the Y, Cr, and Cb components.

Figure 8:
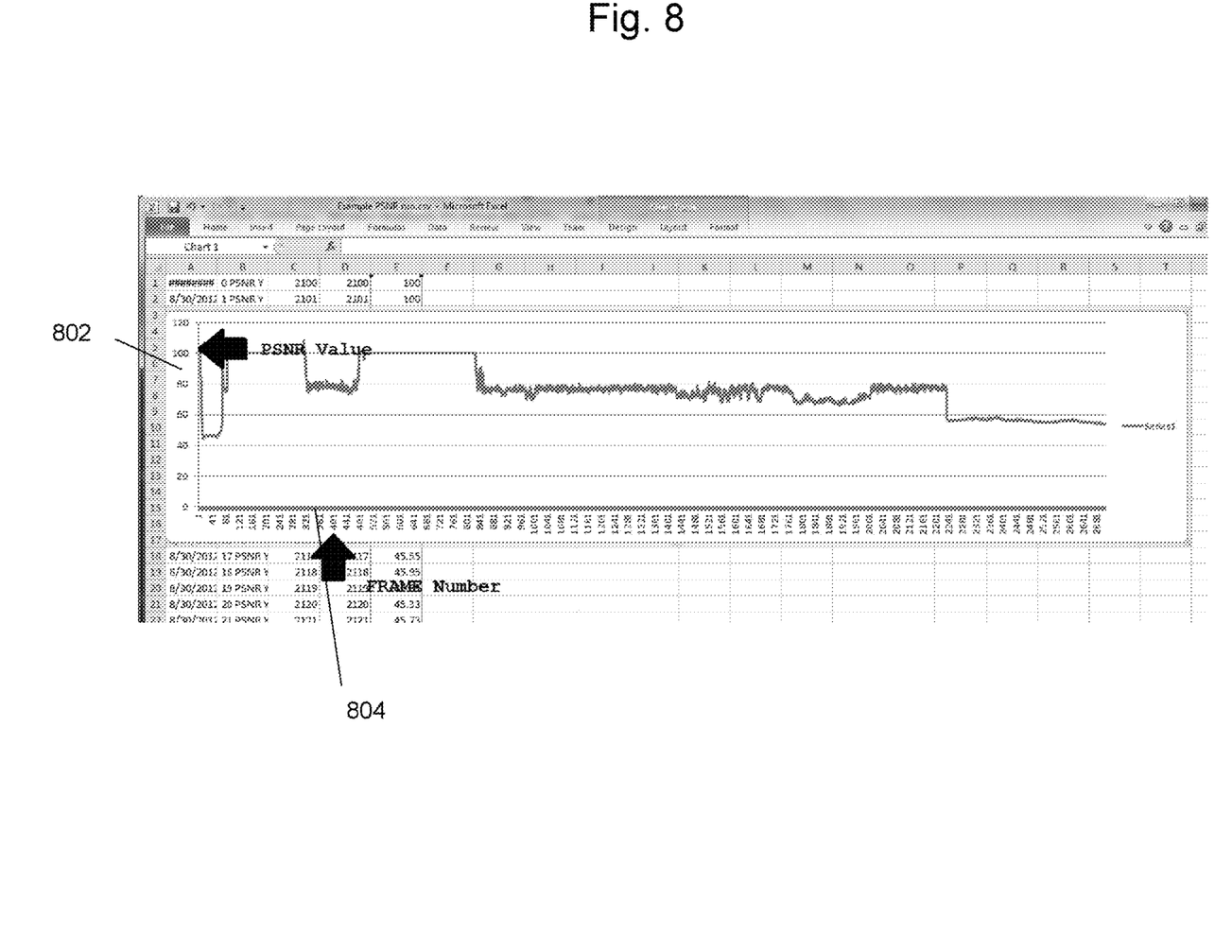
FIG. 8 illustrates a screen shot of a graph generated by a spreadsheet application using exported peak signal-to-noise ratio values exported from the package essence analysis kit according to an exemplary embodiment.

Using the data exported to the spreadsheet application, a graph, like the one illustrated in FIG. 8, may be generated to graphically show the PSNR value in relation to time, where time represents a frame number. The graph may illustrate the PSNR value on the Y axis 802 and the frame number on the x-axis 804. Using a graph such as this, it can be determined whether any frames are particularly degraded in quality. Also, if outlier results exist, a video analyzer may be able to determine that a frame is missing or corrupted.

As described above, the process of analyzing a video file, which may be wrapped as an MXF bundle, may be quickly analyzed without unpackaging the entire video file. By removing the step of unwrapping an MXF file, the analysis may be performed much faster than a process that includes unwrapping the video package or file. Once the PSNR values for the frames are evaluated based on a source, an amount of generational loss from encoding the video file may be determined, and it may be determined if a video file meets certain quality specifications. The PEAK software module may also determine any mismatches or problems in alignment.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "generating" or "synchronizing" or "outputting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A computer implemented method of analyzing a video package essence, the method comprising:
    receiving, by a computer, first and second video files;
    indexing, by a computer, the first and second video files, thereby generating an index value for each respective frame image in the first video file and generating an index value for each respective frame image in the second video file;
    decoding, by a computer, a selected frame of the first video file by accessing a first frame image in the first video file via the index value corresponding to the first frame image, wherein the computer decodes the selected frame of the first video file independent of the first video file, and wherein the first video file remains encoded upon decoding the selected frame of the first video file;
    decoding, by a computer, a selected frame of the second video file by accessing a second frame image in the second video file via the index value corresponding to the second frame image, wherein the computer decodes the selected frame of the second video file independent of the second video file, and wherein the second video file remains encoded upon decoding the selected frame of the second video file; and
    performing, by a computer, video quality analysis by comparing the decoded selected frame of the first video file to the decoded selected frame of the second video file.

2. The method of claim 1, further comprising, performing, by a computer, an alignment and matching test by comparing the decoded selected frame of the first video file to the decoded selected frame of the second video file before performing the video quality analysis.

3. The method of claim 2, further comprising, reporting, by a computer, a result of the alignment and matching test to a user.

4. The method of claim 3, wherein reporting further comprises displaying a first color at a pixel where the decoded selected frame of the first video file matches the decoded selected frame of the second video file and a second color at a pixel where decoded selected frame of the first video file does not match the decoded selected frame of the second video file.

5. The method of claim 1, wherein the video quality analysis is performed by calculating a peak signal-to-noise ratio (PSNR) between the decoded selected frame of the first video file and the decoded selected frame of the second video file.

6. The method of claim 5, wherein the PSNR is calculated for Y, Cr, and Cb.

7. The method of claim 1, wherein at least one of the first and second video files is an MXF video package.

8. The method of claim 7, wherein indexing the MXF video package points to a JPEG2000 encoded video file.

9. The method of claim 1, wherein the decoded selected frame of the first video file or the decoded selected frame of the second video file is loaded into a memory of a computer as a TIFF file.

10. The method of claim 1, further comprising displaying, by a computer, the results of the video quality analysis by displaying pixels less than a quality threshold in a first color, and displaying pixels equal to or greater than the quality threshold in a second color.

11. The method of claim 1, wherein the first video file and the second video files may have different frame rates.

12. The method of claim 1, further comprising exporting, by a computer, results of the video quality analysis for all frames of the first and second video files to a spreadsheet application.

13. The method of claim 1, wherein indexing the first and second video files comprises assigning a reference number for each frame of the first video file and each frame of the second video file.

14. The method of claim 13, wherein the reference number is an index value for a time code or frame number.

15. A computer program product for performing video quality analysis comprising a non-transient computer readable medium having a computer readable program, wherein the computer readable program includes a video analyzer module that when executed on a processor causes a computer to:
    receive first and second video files;
    index the first and second video files, thereby generating an index value for each respective frame image in the first video file and generating an index value for each respective frame image in the second video file;
    decode a selected frame of the first video file by accessing a first frame image in the first video file via the generated index value corresponding to the first frame image, wherein the computer decodes the selected frame of the first video file independent of the first video file, and wherein the first video file remains encoded upon decoding the selected frame of the first video file;
    decode a selected frame of the second video file by accessing a second frame image in the second video file via the generated index value corresponding to the second frame image, wherein the computer decodes the selected frame of the second video file independent of the second video file, and wherein the second video file remains encoded upon decoding the selected frame of the second video file; and
    perform video quality analysis by comparing the decoded selected frame of the first video file to the decoded selected frame of the second video file.

16. The computer program product of claim 15, wherein the computing device is further configured to perform an alignment and matching test by comparing the decoded selected frame of the first video file to the decoded selected frame of the second video file before performing the video quality analysis.

17. The computer program product of claim 15, wherein the video quality analysis is performed by calculating a peak signal-to-noise ratio between the decoded selected frame of the first video file and the decoded selected frame of the second video file.

18. The computer program product of claim 17, wherein the PSNR is calculated for Y, Cr, and Cb.

19. The computer program product of claim 15, wherein the at least one of the first and second video files is an MXF video package.

20. The computer program product of claim 15, wherein the computing device is further configured to display the results of the video quality analysis by displaying pixels less than a quality threshold in a first color, and displaying pixels equal to or greater than the quality threshold in a second color.

\* \* \* \* \*